(12) United States Patent
Lartigue et al.

(10) Patent No.: US 10,309,500 B2
(45) Date of Patent: Jun. 4, 2019

(54) ROLLER MADE OF COMPRESSIBLE MATERIAL

(71) Applicant: MESSIER-BUGATTI-DOWTY, Velizy Villacoublay (FR)

(72) Inventors: Norbert Lartigue, Le Plessis Robinson (FR); Pierre-Guillaume Phelut, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 472 days.

(21) Appl. No.: 15/146,966

(22) Filed: May 5, 2016

(65) Prior Publication Data

US 2016/0333989 A1 Nov. 17, 2016

(30) Foreign Application Priority Data

May 12, 2015 (FR) ...................... 15 54273

(51) Int. Cl.
| | | |
|---|---|---|
| *F16H 13/10* | (2006.01) | |
| *B64C 25/40* | (2006.01) | |
| *F16H 55/32* | (2006.01) | |
| *F16H 13/04* | (2006.01) | |
| *F16D 3/50* | (2006.01) | |
| *F16D 3/76* | (2006.01) | |

(52) U.S. Cl.
CPC .......... *F16H 13/10* (2013.01); *B64C 25/405* (2013.01); *F16D 3/50* (2013.01); *F16H 13/04* (2013.01); *F16H 55/32* (2013.01); *F16D 3/76* (2013.01); *Y02T 50/823* (2013.01)

(58) Field of Classification Search
CPC .......... F16H 13/10; F16H 13/04; F16H 55/32; F16D 3/76
See application file for complete search history.

(56) References Cited

U.S. PATENT DOCUMENTS

| | | | | |
|---|---|---|---|---|
| 1,015,870 A | * | 1/1912 | Cadman ................. | F16H 55/14 74/443 |
| 2,700,253 A | * | 1/1955 | Courtney ............... | B65H 51/08 152/151 |
| 2,794,510 A | * | 6/1957 | Mennesson ........... | B62M 25/00 180/222 |
| 2,941,440 A | * | 6/1960 | Scanlon ................... | D04C 3/00 87/50 |
| 3,385,127 A | * | 5/1968 | Naruse ................... | B21D 26/06 74/443 |
| 3,667,317 A | * | 6/1972 | Hillingrathner ........ | F02B 67/04 123/192.2 |
| 4,108,449 A | * | 8/1978 | Rhodes .................. | A61G 5/022 180/8.2 |
| 4,412,574 A | * | 11/1983 | Popok ..................... | B60C 27/00 152/151 |

(Continued)

*Primary Examiner* — David M Fenstermacher
(74) *Attorney, Agent, or Firm* — Sughrue Mion, PLLC

(57) ABSTRACT

A drive roller (1) comprising a central hub (4), a body (5) extending around the central hub, the body (5) being made of a deformable material, a deformable band (8) extending over a circumference of the drive roller, and first rigid fins (17) and second rigid fins (18) arranged in alternation and extending radially inside the body (5). Each first fin presents a proximal end (17a) fastened to the central hub, and each second fin presents a distal end (18b) that extends in the proximity of the deformable band.

18 Claims, 2 Drawing Sheets

(56) References Cited

U.S. PATENT DOCUMENTS

| | | | | |
|---|---|---|---|---|
| 5,596,905 | A * | 1/1997 | Kurosawa | F16H 55/14 74/443 |
| 5,927,149 | A * | 7/1999 | Moody | F16H 55/14 464/89 |
| 6,420,846 | B1 * | 7/2002 | Wolfe | B64D 9/00 198/780 |
| 8,020,596 | B1 * | 9/2011 | Morrison | B60B 19/00 152/331.1 |
| 2005/0028629 | A1 * | 2/2005 | Acosta | F16H 55/14 74/440 |
| 2006/0053917 | A1 * | 3/2006 | Asari | F16H 55/06 74/423 |
| 2006/0053918 | A1 * | 3/2006 | Asari | F16H 55/06 74/423 |
| 2010/0096833 | A1 * | 4/2010 | Gray | B62H 7/00 280/293 |
| 2010/0314014 | A1 * | 12/2010 | Burns | B60C 7/18 152/301 |
| 2011/0240190 | A1 * | 10/2011 | Summers | G06F 17/5095 152/151 |
| 2012/0038206 | A1 * | 2/2012 | Chadwick | B60C 7/18 301/37.23 |
| 2015/0083292 | A1 * | 3/2015 | Wilson | B29D 30/00 152/151 |
| 2015/0290982 | A1 * | 10/2015 | Sims | B60K 16/00 180/2.2 |

\* cited by examiner

ROLLER MADE OF COMPRESSIBLE MATERIAL

The invention relates to a drive roller, e.g. for driving rotation of a wheel of a vehicle such as an aircraft.

BACKGROUND OF THE INVENTION

Several reasons are causing aircraft manufacturers to try motorizing aircraft wheels, in particular by using drive actuators having electric motors. Such motorization presents significant environmental and economic advantages (reduction in fuel consumption, reduction of noise during taxiing, etc.), and makes it possible to perform new functions: moving the aircraft while its propulsion engines are not operating, taxiing in reverse, remotely controlling the aircraft while it is on the ground, etc.

Designers and systems integrators have studied numerous architectures for actuators for driving aircraft landing gear wheels.

In a first type of architecture, an actuator for driving a wheel in rotation comprises a brushless electric motor, a stepdown gearbox having two reduction stages, a clutch device, and a third stepdown stage driving the wheel in rotation tangentially via connecting rods. In that type of architecture, a relatively large number of parts are permanently connected to the wheel and are subjected to the same mechanical stresses as the wheel (acceleration, vibration, impacts, etc.), thereby raising difficulties of reliability of operation for the drive actuator, and more generally for the function of driving the wheel as performed by the actuator.

In a second type of architecture, the clutch device is replaced by the action of the connecting rods that couple and uncouple the stepdown gearbox and the wheel. That type of architecture is mechanically complex and not very robust. Furthermore, inaccurate positioning of the connecting rods, in particular when coupling at speed when the landing gear and the wheel are deformed, makes it necessary to use coupling rods that are voluminous and thus difficult to integrate between the wheel and the landing gear leg.

In a third type of architecture, the actuator comprises a brushless electric motor, a reduction unit comprising a gearbox and a pinion connected to the outlet of the stepdown gearbox, the pinion meshing with a toothed ring fastened on a rim of the wheel. The actuator is engaged and disengaged relative to the wheel by moving the stepdown unit radially closer to or further away therefrom, thereby enabling the pinion to mesh with the toothed ring or to be separated therefrom. That architecture presents oscillations in the transmission of torque, thereby reducing the lifetime of the drive train.

In order to remedy the above-described drawbacks, proposals have been made to use a drive actuator architecture involving one or more friction rollers associated with means for pressing the friction rollers against the wheel or against a slip track (or ring) mounted on a rim of the wheel in order to cause the wheel to turn. The designs of the drive actuator and of the drive roller itself need to comply with particularly strict requirements applicable to equipment mounted at the bottom of landing gear, where integration of the equipment must be robust in the face of the relatively large amounts of deformation to which wheel rims in particular are subjected, and that equipment must withstand particularly high levels of impact and vibration on landing and while braking after landing.

OBJECT OF THE INVENTION

An object of the invention is to provide a drive roller that is suitable for driving an aircraft wheel in rotation in spite of the relative movements to which the roller and the wheel rim are subjected, and that is mechanically robust so as to present a lifetime that is sufficient.

SUMMARY OF THE INVENTION

In order to achieve this object, the invention proposes a drive roller comprising:
- a central hub;
- a body extending around the central hub, the body being made of a deformable material;
- a deformable band extending around the body over a circumference of the drive roller; and
- first rigid fins and second rigid fins arranged in alternation and extending radially inside the body between the central hub and the deformable band, each first fin presenting a proximal end fastened to the central hub, and each second fin presenting a distal end that extends in the proximity of the deformable band.

The drive roller is advantageously for co-operating with a rigid running track presenting undulations and mounted on a rim of an aircraft landing gear wheel.

The deformable band arranged on the circumference of the drive roller and the deformable body serve to compensate for relative movements between the drive roller and the running track when the roller is pressed against the track by the radial force for actuating the system.

The combination of rigid fins and the body made of deformable material enables a fraction of the torque to be transmitted by co-operation with the undulations of the running track, while the remainder of the torque is transmitted by friction between the deformable material at the periphery and the running track. This serves to reduce the radial force that needs to be developed on the drive roller for transmitting a given level of torque. The deformation of the body also makes it possible to increase the contact area between the drive roller and the running track, and to further reduce local stresses inside the drive roller. Reducing these stresses makes the drive roller more robust and gives it a longer lifetime.

The invention also proposes a drive system for driving a wheel in rotation, the drive system comprising a drive roller as described above and a running track mounted on the wheel, the running track presenting obstacles in the form of undulations.

BRIEF DESCRIPTION OF THE DRAWINGS

The invention can be better understood in the light of the following description made with reference to the figures of the accompanying drawings, in which.

DETAILED DESCRIPTION OF THE INVENTION

Figure 1:
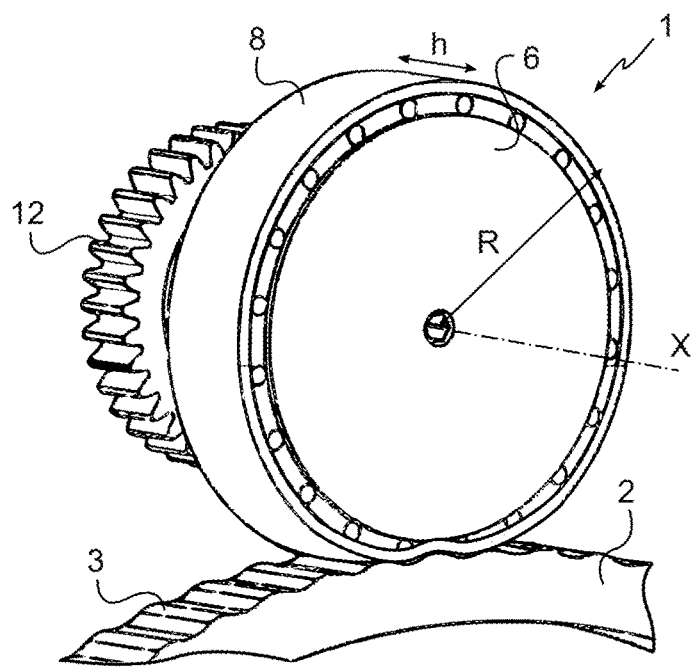
FIG. 1 is a perspective view of a drive roller of the invention in a position engaged with a running track mounted on a wheel rim, a first lateral flank of the roller being visible in FIG. 1.
Figure 2:
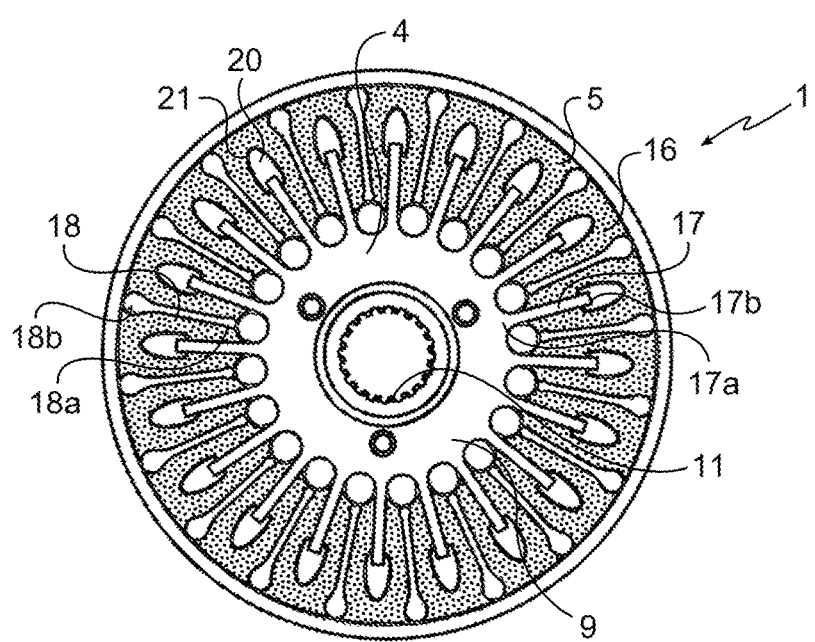
FIG. 2 is a face view of the FIG. 1 roller, with the first flank removed in order to reveal the inside of the drive roller.
Figure 3:
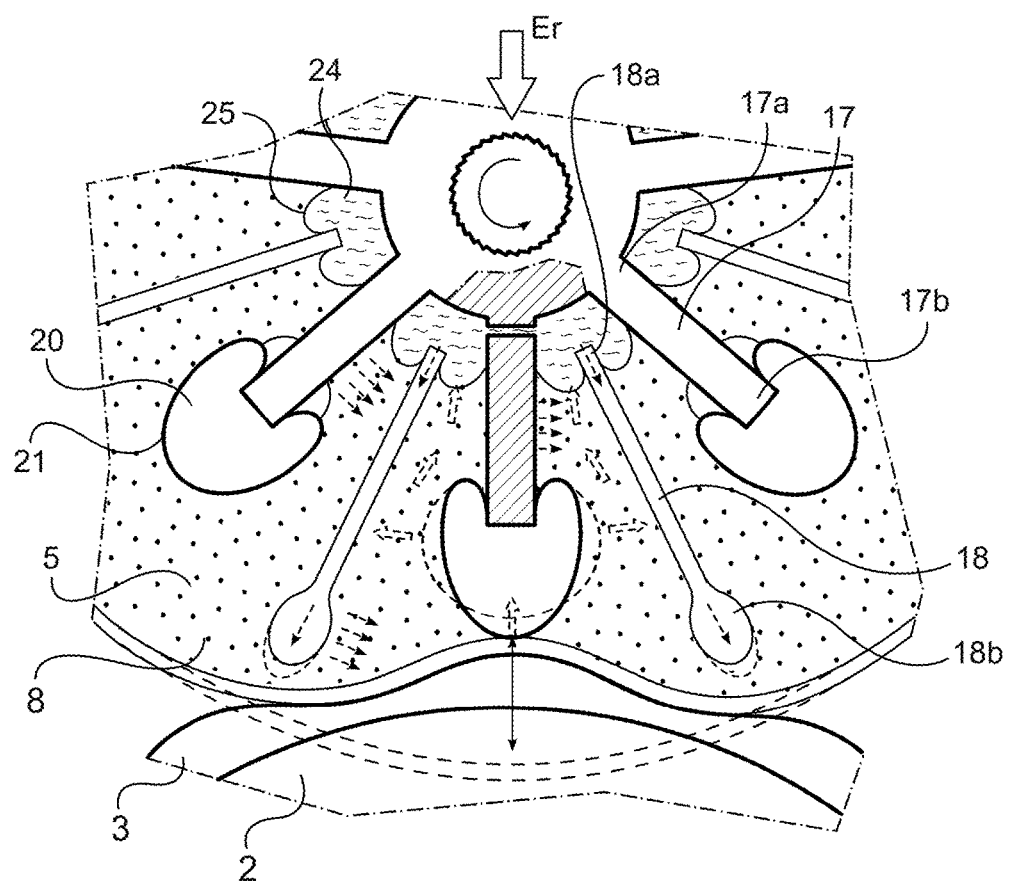
FIG. 3 is a fragmentary face view of the inside of the roller in the engaged position while a radial force is being applied on the roller.

With reference to FIGS. 1 to 3, the drive roller 1 of the invention co-operates in this example with a rigid running track 2 to form a system for driving an aircraft landing gear wheel in rotation.

The rigid running track 2 constitutes a ring mounted coaxially with the wheel on an inside face of a rim of the wheel, said inside face of the rim facing a leg of the aircraft landing gear when the wheel is mounted at the bottom of the landing gear.

The drive roller 1, when positioned in an engaged position as shown in FIGS. 1 and 3, co-operates with obstacles formed on the running track 2, which obstacles are constituted by undulations 3 extending on a circumference of the running track 2 in this example.

At rest, the drive roller 1 presents an outside shape that is generally in the form of a closed cylinder about an axis X, of height h and of outside radius R. The height h is preferably less than the outside radius R, thereby giving the drive roller 1 a flat shape.

The drive roller 1 has a central hub 4, a body 5, lateral flanks 6 (one of them not being shown in the figures, since it is located on the opposite face of the roller that is not visible) and a thin deformable band 8 that is strong against stress in compression and in shear (high tangential stiffness).

The central hub 4 is a metal part having a main portion 9 of generally tubular shape about the axis X and of height h. Inside the main portion 9 of the central hub 4 there is incorporated a fluted female socket 11. This fluted female socket 11 is for receiving a drive shaft, itself connected to a stepdown gear device 12 (visible in FIG. 1) for driving the drive roller 1 in rotation, so as to transmit drive torque to the wheel, and drive the wheel in rotation.

The body 5, which is made of a deformable material, extends around the central hub 4. In this example, the deformable material is a non-compressible material, adapted to be subjected to high levels of compression. In this example, the deformable material is specifically an elastomer type material.

The lateral flanks 6 are metal flanks for preventing the deformable material that forms the body 5 from expanding axially along the axis X, and for increasing the rigidity of the drive roller 1 in compression, and thus for increasing its ability to withstand not only compression stresses but also shear stresses (tangential stresses). The lateral flanks are fastened to the central hub 4.

The deformable band 8 extends round the body 5 over a circumference of the drive roller 1, or in other words, it extends over the outer cylindrical surface of the cylinder constituting the outside shape of the drive roller 1. In this example, the deformable band 8 is made of woven metal wires.

First rigid fins 17 and second rigid fins 18 extend radially and are arranged at regular intervals and in alternation in the body 5 between the central hub 4 and the deformable band 8. The term "arranged in alternation" is used to mean that each first fin 17 is positioned between two second fins 18, and each second fin 18 is positioned between two first fins 17. The first fins 17 and the second fins 18 are embedded in the deformable material forming the body 5.

Each first fin 17 has a proximal end 17a fastened to the central hub 4. In the present example, the first fins 17 are made integrally with the central hub 4. Each first fin 17 has a first length that is less than the thickness of the body 5 (said thickness of the body 5 being equal to the difference between the first radius R and the second radius r), thus making it possible to avoid any contact between a first fin 17 and the deformable band 8 when the deformable band 8 is in contact with the running track 2 while a radial force Er is being applied to the drive roller 1 and thus to the deformable material of the body 5.

Each second fin 18 has a distal end 18b that extends in the proximity of the deformable band 8. The deformable band 8 thus contains the spacing between each second fin 18 on application of a radial force Er to the drive roller 1 and thus to the deformable material of the body 5. The circumferential rigidity of the drive roller 1 is thus increased at the periphery of the body 5. Each second fin 18 presents a second length less than the thickness of the body 5. The second fins 18 can thus move radially when a radial force Er is applied to the drive roller 1 and thus to the deformable material of the body 5, while avoiding any interference with the central hub 4.

The combination of the first and second fins 17 and 18 with the deformable material of the body 5 enables a portion of the torque to be transmitted by friction and also a portion to be transmitted by meshing, with the radial force Er being converted into a tangential force that results from the interference obtained between the undulations 3 of the running track 2 and the deformable material of the body 5 as compressed between the undulations 3. The movement of the deformable material under the radial force also serves to increase the contact area between the drive roller 1 and the running track 2. The combination of the first and second fins 17 and 18 and the deformable material of the body 5 also serves to improve the twisting rigidity about the axis X of the deformable material of the body 5 and thus to improve the ability of the body 5 to transmit torque (tangential force or shear force), by working mainly in compression rather than in shear.

Advantageously, the angular pitch corresponding to the spacing between the second fins 18 corresponds to the pitch of the undulations 3.

First deformable cavities 20 extend in the proximity of the distal ends 17b of each of the first fins 17. More precisely, the distal end 17b of each first fin 17 leads into the corresponding first cavity 20.

In this example, each first cavity 20 is defined by a metal insert 21 fastened to the distal end 17b of the first fin 17. At rest, the first cavities 20 present an elliptical shape with its long direction extending radially. The first cavities 20 are filled with air (or with a material of stiffness that is less than that of the deformable material of the body 5). They deform on application of a radial force Er to the drive roller 1 and thus to the deformable material of the body 5, and they then tend to take up a circular shape. The first cavities 20 thus exert pressure on the deformable material of the body 5 contained under the axis X by the lateral flanks 6, thereby increasing the pressure exerted on the deformable material of the body 5 and thus increasing its stiffness in a tangential direction (or twisting direction) in the zones situated between the second fins 18 and in an axial direction (or compression direction) between the flanks 6.

The ability of the drive roller 1 to transmit torque is thus improved and the rigidity of the drive roller 1 in twisting and in compression is increased.

Second deformable cavities 24 extend at the proximal ends 18a of each of the second fins 18. Each second cavity 24 is formed by a pouch 25 arranged in the deformable material of the body 5 and extending against the central hub 4 between the proximal ends 17a of two first fins 17. The second cavities 24 are at least partially filled with a hydraulic fluid or with some other material. A hydraulic manifold provides fluid flow connection between the second cavities 24, i.e. serves to distribute hydraulic fluid between adjacent second cavities 24.

On application of a radial force Er to the drive roller 1, the second fin 18 located perpendicularly to the contact between the drive roller 1 and the running track 2 retracts radially towards the center of the central hub 4 through a distance corresponding to the shift of the deformable material of the body 5. The second fin 18 then compresses the second cavity 24 situated at its proximal end 18a, thereby having the effect of increasing the pressure in the adjacent second deformable cavity 24 via the hydraulic manifold. This increase of pressure in the adjacent second deformable cavities 24 has the inverse effects of causing the adjacent second fins 18 to project and of stretching the deformable material of the body 5 situated at the distal ends 18b of the adjacent second fins 18 until they come into contact with the deformable band 8 and thus with the running track 2. The area of the deformable material of the body 5 in contact with the running track 2 (via the deformable band 8) is thus increased, thereby serving to distribute the radial force Er that is to be transmitted over a larger angular fraction of the deformable material of the body 5 and reducing local stresses within the deformable material of the body 5. Furthermore, the number of undulations 3 of the running track 2 that are in contact with the drive roller 1 is also increased, thereby improving the contact ratio of the undulations 3 and optimizing the effectiveness and the fraction of the torque that is transmitted by interference. Furthermore, the contact area between the band 8 of deformable material 8 and the running track is also increased, thus having the beneficial effect of reducing local shear stresses (or twisting stresses) due to the transmission of torque in the thin band 8 of deformable material.

The invention is not limited to the particular embodiment described above, but on the contrary covers any variant coming within the ambit of the invention as defined by the claims.

The deformable material of the body of the roller is not necessarily an elastomer.

It is stated that each second fin has a distal end that extends in the proximity of the deformable band. It should be observed that the distal ends of the second fins could optionally be fastened to the deformable band. They may in particular be fastened to the reinforcement of the deformable band itself or indeed to any other reinforcement located at the periphery of the two materials constituting the body 5 and the band 8.

Although it is stated that the deformable band in this example is made of woven wires, the deformable band could be fabricated using any other type of deformable material, and in particular it could include any type of reinforcement: woven or not woven, embedded, made of metal or of ceramic, including any type of unidirectional or multidirectional reinforcing material, etc.

Although it is stated that the flanks are metal flanks, they could perfectly well be fabricated using one or more other materials: composite material, reinforced material, fiber material, etc.

Although it is stated that each of the second deformable cavities is formed by a pouch arranged in the deformable material, they could perfectly well be constituted merely by hollow spaces at the second ends of the second fins.

Although it is stated that the running track has undulations, it could perfectly well be smooth, or indeed rough but without undulations.

Although a system is described that comprises one roller and one track, the invention could naturally be implemented by associating a plurality of rollers with a single track.

It is stated that the second cavities are in fluid flow connection with one another via a hydraulic manifold. It should be observed that it is not necessary for all of the second cavities to be in fluid flow connection with one another via the same manifold, and that it is possible for a plurality of manifolds to interconnect respective pluralities of adjacent second cavities. Furthermore, the fluid flow connection is not necessarily made via a hydraulic manifold, but could be made via a system of calibrated constrictions or via one or more nozzles.

The invention claimed is:

1. A drive roller comprising:
   a central hub;
   a body extending around the central hub, the body being made of a deformable material;
   a deformable band extending around the body over a circumference of the drive roller; and
   first rigid fins and second rigid fins arranged in alternation and extending radially inside the body between the central hub and the deformable band, each first fin presenting a proximal end fastened to the central hub, and each second fin presenting a distal end that extends in the proximity of the deformable band.

2. The roller according to claim 1, wherein the body has respective first cavities in a proximity of a distal end of each first fin.

3. The roller according to claim 2, wherein the distal end of each first fin leads into the corresponding first cavity.

4. The roller according to claim 2, wherein the first cavities are elliptical in shape with a long direction that extends radially.

5. The roller according to claim 1, wherein the deformable band includes reinforcement.

6. The roller according to claim 5, wherein the reinforcement is woven.

7. The roller according to claim 5, wherein the reinforcement is made of metal or ceramic.

8. The roller according to according to claim 1, the roller having two lateral flanks for preventing axial expansion of the deformable material forming the body.

9. A drive system for driving a wheel in rotation, the drive system comprising:
   at least one drive roller according to claim 1, and
   a running track mounted on the wheel, the running track presenting obstacles in the form of undulations.

10. The drive system according to claim 9, wherein a pitch of the second fins corresponds to a pitch of the undulations.

11. The roller according to according to claim 1, wherein the first rigid fins and the second rigid fins are not fixed together.

12. The roller according to according to claim 1, wherein the second fins can move radially when a radial force Er is applied to the drive roller.

13. A drive roller comprising:
   a central hub;
   a body extending around the central hub, the body being made of a deformable material;
   a deformable band extending around the body over a circumference of the drive roller; and
   first rigid fins and second rigid fins arranged in alternation and extending radially inside the body between the central hub and the deformable band, each first fin presenting a proximal end fastened to the central hub, and each second fin presenting a distal end that extends in the proximity of the deformable band,
   wherein the body has respective first cavities in the proximity of a distal end of each first fin, and
   wherein each first cavity is defined by a metal insert fastened to the distal end of the corresponding first fin.

14. A drive roller comprising:
   a central hub;

a body extending around the central hub, the body being made of a deformable material;

a deformable band extending around the body over a circumference of the drive roller; and first rigid fins and second rigid fins arranged in alternation and extending radially inside the body between the central hub and the deformable band, each first fin presenting a proximal end fastened to the central hub, and each second fin presenting a distal end that extends in the proximity of the deformable band, wherein the body includes second cavities, each extending at a proximal end of a corresponding second fin.

15. The roller according to claim 14, wherein each second cavity (24) extends between the central hub and the proximal ends (17a) of two first fins (17).

16. The roller according to claim 14, wherein the second cavities are filled at least in part with a hydraulic fluid.

17. The roller according to claim 16, wherein the second cavities are in fluid flow connection.

18. The roller according to claim 17, wherein the fluid flow connection is made via a hydraulic manifold or a system of calibrated constrictions or a nozzle.

* * * * *